W. Wright,
Jaw Trap,
N° 28,820. Patented June 19, 1860.
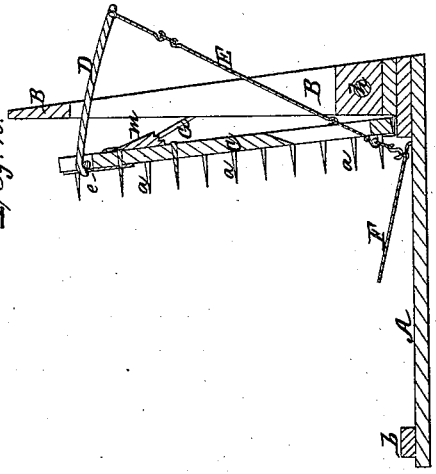
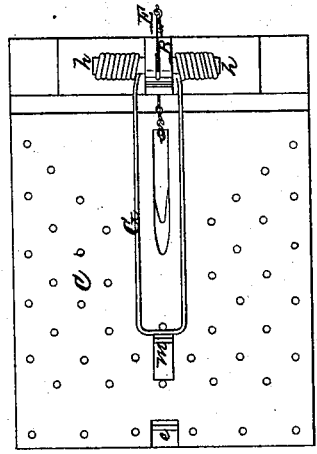
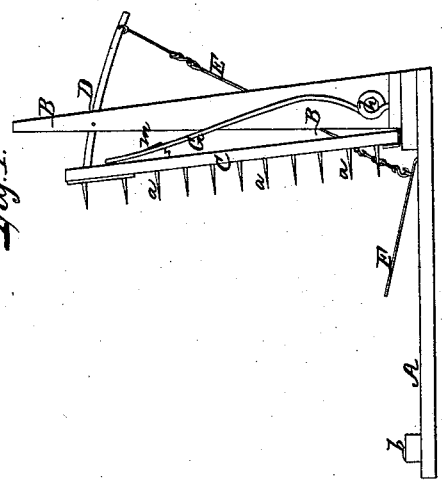
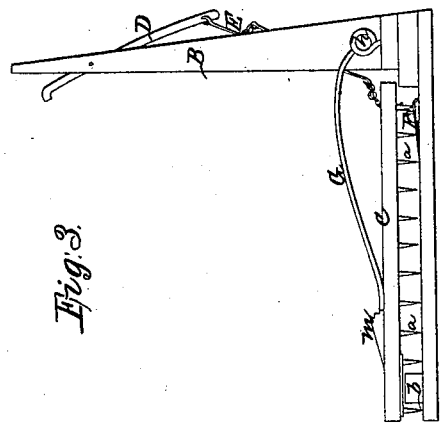
Witnesses.
Henry Howson
Charles E. Foster
Inventor
Wm Wright

UNITED STATES PATENT OFFICE.

WM. WRIGHT, OF PHILADELPHIA, PENNSYLVANIA, ASSIGNOR TO HIMSELF AND JNO. BRADY, OF SAME PLACE.

ANIMAL-TRAP.

Specification of Letters Patent No. 28,820, dated June 19, 1860.

*To all whom it may concern:*

Be it known that I, WM. WRIGHT, of the city of Philadelphia and State of Pennsylvania, have invented a new and useful Improvement in Animal-Traps; and I do hereby declare the following to be a full, clear, and exact description of the same, reference being had to the accompanying drawing and to the letters of reference marked thereon.

My invention consists in the general arrangement of the base of the trap, an upright, a spiked board hinged to the base, a spring, a retaining lever, and a trigger plate, the whole forming a cheap and effective animal trap; also in a notched projection secured to the above mentioned spiked board and arranged in respect to the spring in the manner described hereafter so as to prevent the animal from escaping after it has been caught between the spiked board and the base.

In order to enable others skilled in the art to make and use my invention, I will now proceed to describe its construction and operation.

On reference to the accompanying drawing which forms a part of this specification, Figure 1, is a side view of my improved animal trap with the spiked board elevated; Fig. 2, a sectional view of Fig. 1; Fig. 3, a side view with the spiked board depressed, and Fig. 4, a ground plan.

Similar letters refer to similar parts throughout the several views.

A is the base of the trap having at one end an upright B near the foot of which is hinged a board *c* having on the under side a series of spikes, the board when down resting on a strip *l* secured to the base A.

Near the top of the upright and within a slot cut in the same is hung the lever D the bent end of one arm of which catches over a wire *e* secured to the outer end of the spiked board when the latter is elevated. The end of the long arm of the lever D is connected by a rod or chain E to the trigger plate F near the point where the latter is hinged loosely to the base A of the trap, an opening being cut into the spiked board to admit the rod or chain which passes through the slot on the upright B.

G is the spring consisting of a bent wire one end of which is coiled several times round a pin *h* on one side of the upright, and the other end round the same pin on the opposite side of the upright through the lower end of which the pin passes and is firmly secured, the wires at the ends of the coils passing into a strip attached to the base. The outer end of the spring bears against the outside of the spiked board, the spring being of such a length that when the board is elevated it extends beyond the notched shoulder of the projection *m*, which is secured to the outside and near the end of the said spiked board. When the latter has fallen, as seen in Fig. 3, however, the end of the spring will coincide or nearly so, with the lowest notch of the said projection *m*.

The spiked board being raised and the bent end of the lever D being placed over the wire *e* the outer end of the trigger plate F being thereby slightly raised, the trap is set ready to receive the bait which is placed either directly on the plate or on a cloth spread over both plate and base so that it may have no prominent and unusual appearance to deter the animal from approaching the trap. The part of the plate first touched by the animal will be near its outer edge so that considerable leverage will be exerted to pull down the long arm of the lever, the slightest touch of the plate therefore will release the bent end of the lever from the wire *e* and the spiked board must consequently descend with a rapidity and force corresponding to the strength of the spring. The moment the board has descended, the end of the spring takes its place in one or other of the notches on the projection *m* so that the spring serves to retain the spiked board in its depressed position and frustrates the efforts of the animal to escape.

I claim as my invention and desire to secure by Letters Patent—

1. The general arrangement of the base A the upright B, spiked board C, spring G, lever D, and trigger plate F.

2. The projection *m* on the spiked board C when the notches of the said projection are arranged in respect to the spring as and for the purpose herein set forth.

In testimony whereof, I have signed my name to this specification, in the presence of two subscribing witnesses.

WM. WRIGHT.

Witnesses:
 HENRY HOWSON,
 CHARLES D. FREEMAN.